Patented Nov. 21, 1939

2,180,778

UNITED STATES PATENT OFFICE 2,180,778

ASYMMETRIC ARSENO COMPOUNDS

Karl Streitwolf, deceased, late of Frankfort-on-the-Main, Germany, by Frieda Streitwolf, administratrix, Frankfort-on-the-Main, Germany, Alfred Fehrle, Bad Soden, Taunus, and Walter Herrmann, Frankfort-on-the-Main-Hochst, Germany, assignors to Winthrop Chemical Company, Inc., New York, N. Y., a corporation of New York No Drawing. Original application December 23, 1930, Serial No. 504,414. Divided and this application March 2, 1937, Serial No. 128,691. In Germany July 22, 1930

4 Claims. (Cl. 260—300)

The present invention relates to asymmetric arseno compounds, more particularly to compounds of the following general formula:

X—As=As—Y—O.CH$_2$.COOZ wherein X stands for an aryl radical, Y stands for a benzimidazole radical, which radicals X and Y may be substituted, in every case at least one of the radicals X and Y containing as a substituent of the aryl nucleus a substituted amino group and Z stands for hydrogen or an alkali metal.

Arsenobenzene derivatives, which are used as a remedy have been transformed into water-soluble preparations of neutral reaction. The compounds thus obtained have a good action when intravenously injected, but they are not tolerated when subcutaneously or intramuscularly injected, on account of the very strongly irritating effect.

Now we have found that compounds of general application are made by reducing to asymmetric arsenobenzenes phenoxy-acetic acid-arsonic acids or aryl-arsonic acids which have an imidazole ring containing glycolic acid as substituent, together with other therapeutically active aryl-arsonic acids, or by producing the asymmetric arseno-benzenes according to known methods from the derivatives of the corresponding arsonic acids containing trivalent arsenic and in cases in which the product to be obtained contains a primary amino group or groups, acylating such group or groups or causing the arseno-benzene to react with compounds capable of condensing with a primary amino group such as formaldehyde-bisulfite or glycide.

These new compounds have, as is required in modern therapy, a good action when intravenously, subcutaneously or intramuscularly injected and are well tolerated.

The following examples illustrate the invention, but they are not intended to limit it thereto:

(1) 7.4 grams of 4-acetylamino-2.3-dimethyl-1-phenyl-5-pyrazolone-para-arsonic acid and 6.6 grams of 1-methyl-2-acetic acid-benzimidazol-5-arsonic acid (obtained by causing 1-methylbenzimidazolone-5-arsonic acid to act upon mono-chloracetic acid) are mixed with 10 grams of sodium acetate and 6 grams of potassium iodide. The mixture is reduced at 60° C. in 84 cc. of glacial acetic acid by means of 24 cc. of hypophosphorous acid of 25 per cent. strength. The arsenic compound thus formed is filtered by suction and washed and then stirred with 50 cc. of methyl alcohol; 70 cc. of water are added and the whole is dissolved by addition of 2N-sodium carbonate solution. By introducing the filtered solution, while stirring, into 10 parts by volume of acetone the solid preparation is caused to separate in the form of a yellow powder which dissolves in water to a clear and neutral solution. The product obtained has the following formula:

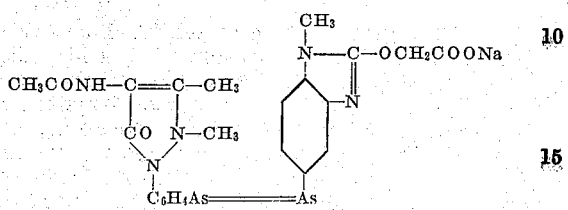

(2) 11.6 grams of 3-amino-4-hydroxybenzene-arsonic acid are dissolved in 31 cc. of 2N-caustic soda solution and 31 cc. of water and a solution of 16.5 grams of 1-methyl-2-oxyacetic acid benzimidazole-5-arsonic acid (cf. Example 1) in 56 cc. of 2N-caustic soda solution and 56 cc. of water is added thereto. The filtered mixture is diluted with 500 cc. of water and reduced at 65° C. by means of hydrosulfite. The washed arsenic compound is made into a paste with 200 cc. of methyl alcohol, 150 cc. of water at 50° C. are added thereto and the whole is filtered. By introducing the filtrate, while stirring, into 10 parts by volume of acetone the desired compound is caused to separate in a solid form. It dissolves in water to a clear and neutral solution. For the transformation by formaldehyde-bisulfite, 22 grams of the arsenic compound thus obtained are dissolved in 110 cc. of water, 15 grams of sodium formaldehyde-bisulfite are added thereto and the whole is stirred at 50° C. until a test portion can no longer be diazotized. The filtered solution is introduced while stirring into 10 parts of alcohol and the precipitated product is filtered by suction. The compound dissolves in water to a clear and neutral solution. The product obtained has the following formula:

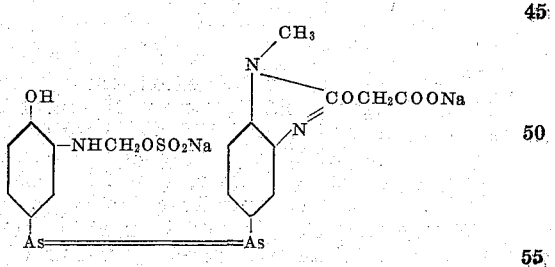

(3) 8.25 grams of 1-methyl-2-oxy-acetic acid-benzimidazol-5-arsonic acid, dissolved in 28 cc. of 2N-caustic soda solution and 28 cc. of water, and 6.9 grams of 3-acetyl-amino-4-hydroxy-benzene-1-arsonic acid, dissolved in 15.5 cc. of 2N-caustic soda solution and 15.5 cc. of water, are mixed together and, after addition of 250 cc. of water, the mixture is reduced at 65° C. by means of 98 grams of hydrosulfite. The isolated arsenic compound is dissolved in 50 cc. of methyl alcohol and 70 cc. of water and the solution is neutralized with 2N-acetic acid. The filtered solution is introduced, while stirring, into 10 parts by volume of alcohol and the product which has separated is filtered by suction. It dissolves in water to a neutral and clear solution. The product obtained has the following formula:

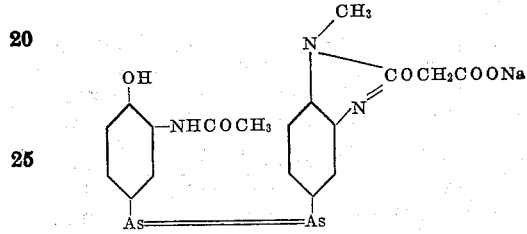

(4) 16.4 grams of 4-amino-2.3-dimethyl-5-pyrazolone-1-phenyl-para-arsonic acid, dissolved in 31 cc. of 2N-caustic soda solution and 31 cc. of water, and 16.5 grams of 1-methyl-2-oxy-acetic acid-benzimidazol-5-arsonic acid, dissolved in 56 cc. of 2N-caustic soda solution and 56 cc. of water, are mixed and after addition of 500 cc. of water the mixture is reduced by means of 195 grams of hydrosulfite. The separated arsenic compound is introduced, while stirring, into 100 cc. of methyl alcohol and dissolved by addition of 100 cc. of water at 50° C. In order to separate the product, the filtered solution is introduced, while stirring, into 10 parts of alcohol and 4 parts of ether are added thereto. The compound dissolves in water to a clear solution.

15 grams of the arsenic compound thus obtained are dissolved in 75 cc. of water and 6 grams of sodium formaldehyde-bisulfite are added. The whole is stirred at 50° C. until a test portion can no longer be diazotized. The filtered solution is then introduced, while stirring, into 10 parts by volume of alcohol and the compound which has separated is filtered by suction. It dissolves in water to a clear and neutral solution. The product obtained has the following formula:

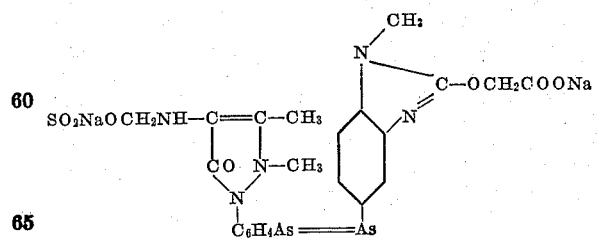

(5) 6.8 grams of 2-hydroxy-methylbenzimidazol-5-arsonic acid dissolved in 15.5 cc. of 2N-caustic soda solution and 15.5 cc. of water, and 8.25 grams of 1-methyl-2-oxy-acetic acid-benzimidazol-5-arsonic acid, dissolved in 28 cc. of 2N-caustic soda solution and 28 cc. of water, are mixed together and, after addition of 250 cc. of water, the mixture is reduced by means of 98 grams of hydrosulfite. The separated arsenic compound is stirred with 150 cc. of methyl alcohol and dissolved by addition of 100 cc. of water at 50° C. The solution is introduced, while stirring, into 10 parts by volume of acetone. The compound dissolves in water to a clear and neutral solution. The product obtained has the following formula:

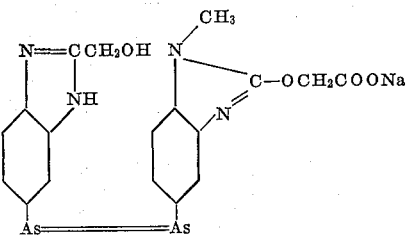

This application is a division of our application Serial Number 504,414, filed December 23, 1930, which has matured into Patent No. 2,095,577.

We claim:
1. The asymmetric arseno compounds of the following formula:

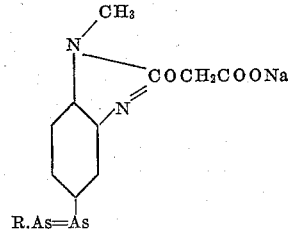

wherein R stands for a benzene nucleus which contains at least one residue selected from the group consisting of —NHCH₂OSO₂Na, —NHCOCH₃ and a 4-amino-2.3-dimethyl-pyrazolone radical substituted in the amino group, readily dissolving in water to neutral solutions of good efficacy and tolerability when applied intravenously, subcutaneously or intramuscularly.

2. The compound of the following formula:

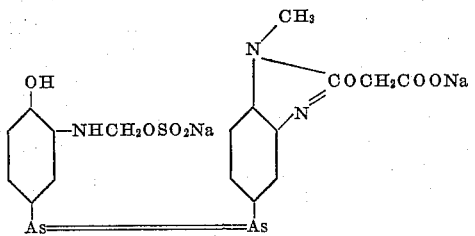

readily dissolving in water to a neutral solution of good efficacy and tolerability when applied intravenously, subcutaneously or intramuscularly.

3. The compound of the following formula:

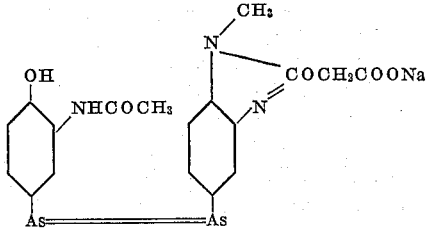

readily soluble in water to a neutral solution of good efficacy and tolerability when applied intravenously, subcutaneously or intramuscularly.
4. The compound of the following formula:
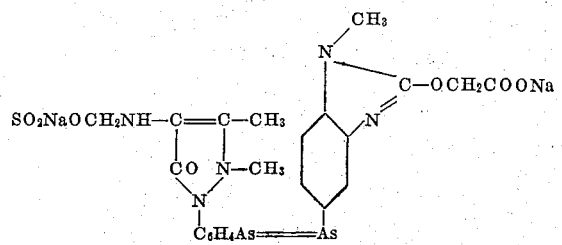
readily soluble in water to a neutral solution of good efficacy and tolerability when applied intravenously, subcutaneously or intramuscularly.
FRIEDA STREITWOLF,
*As Administratrix of Karl Streitwolf, Deceased.*
ALFRED FEHRLE.
WALTER HERRMANN.